(No Model.)
G. REININGHAUS.
PREPARATION OF MALT.
No. 419,707. Patented Jan. 21, 1890.
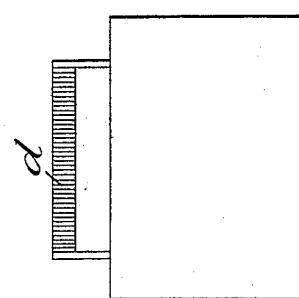
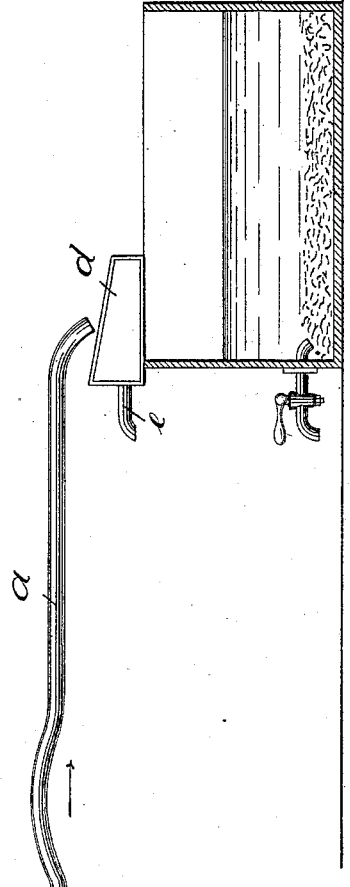
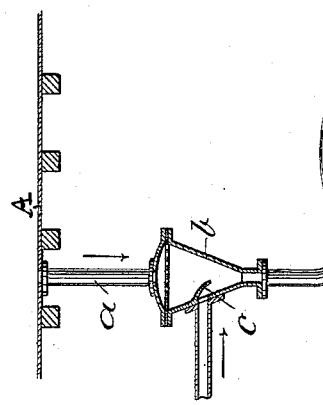
Witnesses:
Hopkins
Theodor Heese
Inventor.
Gustav Reininghaus
by his Attorneys

UNITED STATES PATENT OFFICE.

GUSTAV REININGHAUS, OF MENTZ, HESSE, GERMANY.

PREPARATION OF MALT.

SPECIFICATION forming part of Letters Patent No. 419,707, dated January 21, 1890.

Application filed July 20, 1889. Serial No. 318,143. (No model.) Patented in England April 8, 1889, No. 5,981, and in Germany June 24, 1889.

*To all whom it may concern:*

Be it known that I, GUSTAV REININGHAUS, brewery manager, residing at 23 Mathilden Terrasse, Mentz, in the Grand Duchy of Hesse, German Empire, have invented certain new and useful Improvements in the Preparation of Malt, (for which I have applied for patent in Germany under date of June 24, 1889, and have obtained a patent in Great Britain, No. 5,981, dated April 8, 1889,) of which the following is a full and clear specification.

The steeping of the grain (barley) in breweries and brandy-distilleries takes place in steeping-tanks. The grain separated from water is introduced into the said tanks and then mixed with water therein. In this process it is necessary that the grain be transported to the steeping-tanks by some particular means—such, for instance, as elevators, carts, spirals, &c. Here it is mixed with water and by a continual stirring cleansed of any dirt it may contain. This separated work, the transport and then stirring of the grain, is avoided in the invention hereinafter described. I introduce a water-pipe into the grain-supply pipe and thereby cause the grain to be transported to the steeping-tanks by the pressure of the water. In this manner the grain will be thoroughly cleansed in passing through the supply-pipe to the tanks, and, further, becomes properly damp. The amount of water entering the supply-pipe can be regulated to correspond with the amount of grain.

In order to make my invention more clear, I refer to the accompanying drawings.

Figure 1 shows an end view of the tank, showing the separator $d$. Fig. 2 shows an elevation of the whole apparatus, showing the steeping-tank in section and a section through the mixing-box $b$.

A is the grain-floor, from whence the grain passes through pipe $a$ into the mixing-box $b$. Mixing-box $b$ is connected with the water-supply at $c$, and has a coarse sieve over its upper end, by means of which the grain is separated, so that it is thoroughly mixed with the water. The grain then passes along the pipe-connection $a$ under the pressure of the water and runs out at the end into the separator $d$. The separator $d$, as will be seen from Fig. 1, has a number of vertical ribs and a water-outlet $e$. This water-outlet stands a little below the level of the opposite side of the separator, so that the grain will pass over the side into the steeping-tank, while the water will run out at $e$, taking with it all the dust and impurities which were in the grain.

In transporting the grain by means of water-pressure the pipes can be bent in any desired manner, so that the grain-floor may lie at any distance from the tanks. Of course the water may be driven into the transport-pipe by means of a centrifugal pump or any other means.

Having thus fully described the nature of my said invention and in what manner the same is to be performed, what I desire to secure by Letters Patent of the United States is—

In a grain conveying and cleaning apparatus, the combination of the conveying-pipes $a$, communicating with an opening in a grain-floor and with a separator, the mixing-chamber $b$, provided with a water-inlet, the separator $d$, provided with a water-outlet, and the steeping-tank beneath the separator.

In witness whereof I have hereunto set my hand in presence of two witnesses.

GUSTAV REININGHAUS.

Witnesses:
 CARL ED. HALZ,
 FRANZ GRAU.